(12) United States Patent
Kozuki (10) Patent No.: US 11,474,221 B2
(45) Date of Patent: Oct. 18, 2022

(54) APPARATUS AND METHOD FOR DETECTING OBJECTS IN WATER BODIES

(71) Applicant: FURUNO ELECTRIC CO., LTD., Nishinomiya (JP)

(72) Inventor: Kohei Kozuki, Kariya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 25 days.

(21) Appl. No.: 16/933,842

(22) Filed: Jul. 20, 2020

(65) Prior Publication Data

US 2021/0116554 A1   Apr. 22, 2021

(30) Foreign Application Priority Data

Oct. 18, 2019  (EP) ..................................... 19204096

(51) Int. Cl.
| | |
|---|---|
| *G01S 7/524* | (2006.01) |
| *G01C 13/00* | (2006.01) |
| *G01N 29/04* | (2006.01) |
| *G01S 7/52* | (2006.01) |
| *G01S 15/04* | (2006.01) |
| *G01S 15/89* | (2006.01) |
| *G01S 15/96* | (2006.01) |

(52) U.S. Cl.
CPC ............ *G01S 7/524* (2013.01); *G01C 13/008* (2013.01); *G01N 29/04* (2013.01); *G01S 7/52004* (2013.01); *G01S 15/04* (2013.01); *G01S 15/89* (2013.01); *G01S 15/96* (2013.01); *G01N 2291/028* (2013.01); *G01N 2291/2638* (2013.01)

(58) Field of Classification Search
None
See application file for complete search history.

(56) References Cited

U.S. PATENT DOCUMENTS

| | | | |
|---|---|---|---|
| 4,084,150 A | 4/1978 | Massa | |
| 5,482,046 A * | 1/1996 | Deitrich | ............. G01S 7/52046 600/458 |
| 6,421,299 B1 | 7/2002 | Betts et al. | |
| 6,678,209 B1 * | 1/2004 | Peng | ................... G01S 7/52001 367/95 |
| 9,268,020 B2 * | 2/2016 | Coleman | ............... G01S 15/003 |

(Continued)

FOREIGN PATENT DOCUMENTS

| | | |
|---|---|---|
| JP | 2014013162 A | 1/2014 |
| WO | 2016/010620 A1 | 1/2016 |

OTHER PUBLICATIONS

The extended European search report issued by the European Patent Office dated Apr. 20, 2020, which corresponds to European Patent Application No. 19204096.2-1206 and is related to U.S. Appl. No. 16/933,842.

*Primary Examiner* — Isam A Alsomiri
*Assistant Examiner* — Vikas Atamkuri
(74) *Attorney, Agent, or Firm* — Studebaker & Brackett PC (57) ABSTRACT

An apparatus and a method are provided for detecting one or more objects under a surface of a water body. The method includes transmitting one or more ultrasonic waves into the water body according to a transmit beam pattern. The method further includes determining a bottom characteristic of a bottom of the water body and dynamically adjusting the transmit beam pattern, based on the bottom characteristic of the water body.

17 Claims, 5 Drawing Sheets

(56) References Cited

U.S. PATENT DOCUMENTS

| | | | |
|---|---|---|---|
| 2009/0299185 A1* | 12/2009 | Oikawa | A61B 8/4254 600/447 |
| 2013/0308850 A1* | 11/2013 | Oikawa | G01S 7/52085 382/131 |
| 2014/0269192 A1* | 9/2014 | Proctor | G01S 15/89 367/88 |
| 2016/0018515 A1* | 1/2016 | Brown | G01S 7/52003 367/11 |
| 2016/0049143 A1* | 2/2016 | Matson | G01S 7/526 367/103 |
| 2016/0341827 A1* | 11/2016 | Horner | G01S 15/8902 |
| 2017/0150948 A1* | 6/2017 | Kanayama | G01S 7/52071 |
| 2017/0176586 A1* | 6/2017 | Johnson | G01C 17/38 |
| 2018/0011192 A1 | 1/2018 | Blakey | |
| 2018/0156891 A1* | 6/2018 | Brune | G01S 7/2813 |
| 2018/0335511 A1* | 11/2018 | Brown | G01S 15/8902 |
| 2019/0265340 A1* | 8/2019 | Antao | G01S 7/521 |
| 2019/0317185 A1* | 10/2019 | Park | G01S 7/03 |
| 2020/0041630 A1* | 2/2020 | Nguyen | A61B 8/4254 |
| 2020/0088869 A1* | 3/2020 | Pefkianakis | G01S 13/762 |

\* cited by examiner

| Direction (in deg) in Shallow water body | Attenuation (in dB) compared to highest intensity |
|---|---|
| 90 | At least 35 dB attenuation |
| 60 | At least 30 dB attenuation |
| 30 | At least 20 dB attenuation |

Table 1

| Direction (in deg) in Deep water body | Attenuation (in dB) compared to highest intensity |
|---|---|
| 90 | At least 30 dB attenuation |
| 60 | At least 10 dB attenuation |
| 30 | At least 5 dB attenuation |

Table 2

APPARATUS AND METHOD FOR DETECTING OBJECTS IN WATER BODIES

CROSS-REFERENCE TO RELATED APPLICATIONS

This application claims priority under 35 U.S.C. § 119 to European Patent Application No. 19204096.2, which was filed on Oct. 18, 2019, the entire disclosure of which is hereby incorporated by reference.

TECHNOLOGICAL FIELD

An example embodiment of the present disclosure generally relates to detection of one or more objects in water bodies, and more particularly relates to an apparatus and a method for dynamically adjusting a transmit beam pattern of one or more ultrasonic waves for detecting the one or more objects in water bodies.

BACKGROUND

Watercrafts (for example ships, submarines, boats, or the likes) use sonars for detecting one or more objects in a water body (for example seas, oceans, lakes, or the likes). The sonar transmits one or more ultrasonic waves in the water body and receives echoes reflected from the one or more objects in the water body and/or from a bottom of the water body. The one or more objects may be one or more fish schools or any other aquatic objects. Generally, intensities of the echoes received from the bottom of the water body are more than intensities of the echoes received from the one or more objects. Due to this, the echoes from the water bottom interfere and mask the echoes from the one or more objects. This may lead to improper or no detection of the one or more objects in the water body.

Currently, sonars with a transducer that has a transmit beam pattern with an attenuated intensity level in a direction perpendicular to the water bottom, are utilized to transmit the one or more ultrasonic waves in the water body. The one or more ultrasonic waves transmitted according to such transmit beam pattern reduces intensity of echoes received from the bottom of the water to some extent and reduces masking of echoes returned from the one or more objects. However, characteristics of the water bottom (for e.g. depth) vary from place to place. Thus, when such a transmit beam pattern with an attenuated intensity level in a direction perpendicular to the water bottom is used to transmit the one or more ultrasonic waves in a deep water body (i.e. with the deep water bottom), even though there will be no influence of echoes from the water bottom, detection of the one or more objects situated in the vertically downward direction becomes difficult. Accordingly, there is a need for a solution that dynamically adjusts parameters of the transmit beam pattern according to characteristics of the bottom of the water body so as to permit accurate detection of the one or more objects.

SUMMARY

In order to solve the foregoing problem, various embodiments of the present disclosure provide a sonar apparatus for detecting one or more objects under a surface of a water body. The apparatus comprises a transducer array comprising a plurality of transducer elements. The transducer array is configured to transmit one or more ultrasonic waves into the water body according to a transmit beam pattern. The apparatus further comprises processing circuitry configured to determine a bottom characteristic of a bottom of the water body and dynamically adjust the transmit beam pattern, based on the bottom characteristic of the water body.

According to some example embodiments, the bottom characteristic comprises at least one of a depth of the bottom of the water body less than a threshold depth value, a depth of the bottom of the water body greater than the threshold depth value, a surface hardness of the bottom of the water body more than a threshold value of surface hardness, or a surface hardness of the bottom of the water body less than the threshold value of surface hardness. Upon determination that the bottom characteristic corresponds to the bottom with the depth less than the threshold depth value, the processing circuitry is further configured to adjust, via a transmitter, the transmit beam pattern with a first set of transmit intensity values in a range of directions in a vicinity of the vertically downward direction and with a second set of transmit intensity values in other directions in a range of directions between the surface of the water body and the vertically downward direction. Further, the first set of transmit intensity values is less than the second set of transmit intensity values. Upon determination that the bottom characteristic corresponds to the bottom with the depth more than the threshold depth value, the processing circuitry is further configured to adjust, via the transmitter, the transmit beam pattern with a third set of transmit intensity values in the range of directions in the vicinity of the vertically downward direction and with a fourth set of transmit intensity values in the other directions. The third set of transmit intensity values is less than the fourth set of transmit intensity values. Further, one or more of the first set of transmit intensity values are less than the third set of transmit intensity values and the second set of transmit intensity values is less on average than the fourth set of transmit intensity values.

According to another embodiment, a method for detecting one or more objects under a surface of a water body is provided. The method comprises transmitting one or more ultrasonic waves into the water body according to a transmit beam pattern, determining a bottom characteristic of a bottom of the water body, and dynamically adjusting the transmit beam pattern, based on the bottom characteristic of the water body.

The foregoing summary is illustrative only and is not intended to be in any way limiting. In addition to the illustrative aspects, embodiments, and features described above, further aspects, embodiments, and features will become apparent by reference to the drawings and the following detailed description.

According to this disclosure, an apparatus and a method for improving detection of one or more objects in water bodies may be provided.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Further, the terms "processor", "controller" and "processing circuitry" and similar terms may be used interchangeably to refer to the processor capable of processing information in accordance with embodiments of the present invention. Further, the terms "sonar", "sonar apparatus" and "apparatus" are used interchangeably to refer to the sonar in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example." "For instance." and "such as", and the verbs "comprising," "having" "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

An apparatus and a method provided herein utilize a sonar apparatus for detecting one or more objects in a water body. The apparatus and the method obtain a bottom characteristic of a bottom of the water body. The bottom characteristics may either be determined by one or more external devices or determined by the apparatus. The apparatus may obtain the bottom characteristic from the one or more external devices. Based on the determined bottom characteristic, the apparatus and the method dynamically adjusts a transmit beam pattern. In some embodiments, adjusting the transmit beam pattern includes applying constraints that include different attenuation values of intensities in different directions and amplitude of one or more ultrasonic waves. According to the adjusted transmit beam pattern, the one or more ultrasonic waves are transmitted within a range of directions between the surface of the water body and a vertically downward direction. Such dynamic adjustment of the transmit beam pattern prevents echoes returned from the one or more objects from getting masked by echoes returned from the bottom of the water body. This improves precision of detecting the one or more targeted objects under water. These and other technical improvements would become evident from the disclosure provided herein.

Figure 1:
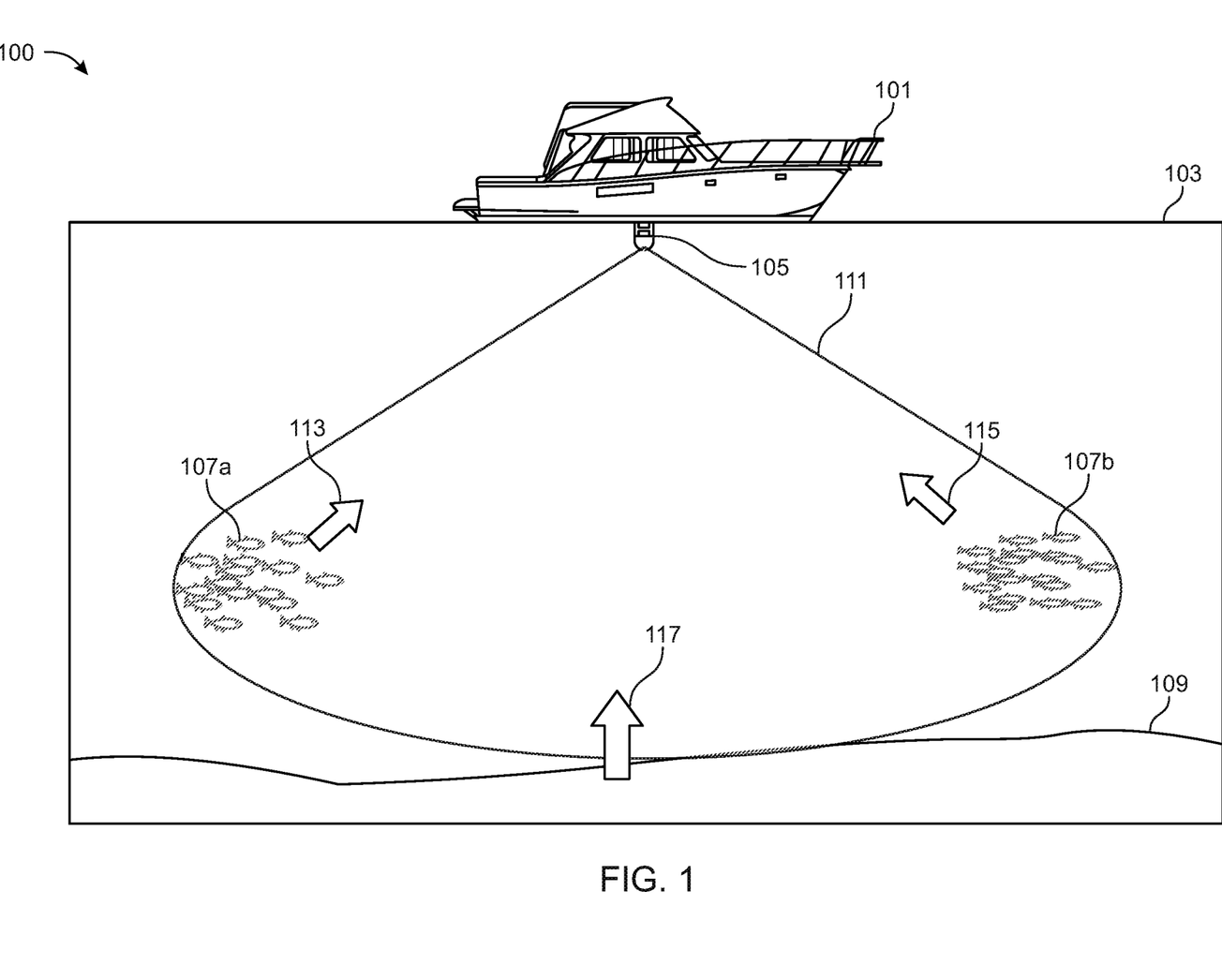
FIG. 1 illustrates a schematic diagram that exemplarily illustrates a working environment configuration of a sonar apparatus for detecting one or more objects under a surface of a water body, in accordance with an example embodiment of the present disclosure.

FIG. 1 is a schematic diagram that exemplarily illustrates a working environment configuration 100 of a sonar apparatus 105 for detecting one or more objects 107a, 107b underwater, in accordance with an example embodiment. A watercraft 101 in a water body 103 may comprise the sonar apparatus 105 (hereinafter interchangeably referred as "sonar 105" or "apparatus 105") for detecting the one or more objects 107a, 107b in the water body 103. The one or more objects 107a, 107b may be one or more fish schools, icebergs, sunken ships, or the likes. The fish schools may be a group of fish swimming in a same direction in a coordinated manner. The sonar apparatus 105 may comprise a sonar transducer that may be disposed at bottom of the watercraft 101 or in any configuration suitable for detection of the one or more objects 107a, 107b. It shall be noted that for illustrative purpose two objects (107a, 107b) have been shown, however to one having ordinary skill in the art it will be apparent that the present disclosure applies to any number of objects less or more than two.

The watercraft 101 may be any vehicle, capable of traversing in or on surface of the water body 103, such as a ship, a boat, a hovercraft, a submarine or the like. Hereinafter, the watercraft 101 equipped with the sonar apparatus 105 may be referred to as a 'vessel.' The water body 103 may be a part of an ocean, a sea, a lake, a pond, a river, or a reservoir. The water body may be a deep water body or may be a shallow water body depending on the depth of water bottom 109 from an upper surface of the water body 103. Further, the water bottom 109 may be made up of different sediments for example, gravels, rocks, sand, or the likes. Depending upon the sediments, surface of the water bottom 109 may be hard or soft.

The sonar apparatus 105 may transmit ultrasonic waves within a range of directions 111 between the surface of the water body 103 and the vertically downward direction and receive reflected waves 113, 115 and 117 from at least one of the one or more objects 107a, 107b and the water bottom 109. The reflected waves may also be referred to as "echoes". In some embodiments, the sonar apparatus 105 transmits waves within the range of directions between the surface of the water body 103 and the vertically downward direction and receives reflections or echoes of the transmitted waves. Thus, the sonar apparatus 105 may search for the one or more objects 107a, 107b within the range of directions between the surface of the water body 103 and the vertically downward direction. Subsequently, one or more of the one or more objects 107a, 107b may be detected by the sonar apparatus 105. In some example embodiments, the sonar apparatus 105 may detect aquatic objects such as fish schools, or any other submerged object, such as a sunken ship or boat, a rock, driftwood, from which one or more ultrasonic waves transmitted by the sonar apparatus 105 may be reflected. In some example embodiments, the sonar apparatus 105 may be a three dimensional (3D) sonar that can perform three-dimensional detection of the one or more objects 107a, 107b.

In an example embodiment, the sonar apparatus 105 may obtain the bottom characteristic from the one or more external devices. The one or more external devices may be depth sounders or other ultrasonic devices. The one or more external devices may be installed underneath the bottom surface of the vessel 101 or in any configuration suitable for obtaining the bottom characteristic from the one or more external devices. In an alternative or additional embodiment, the bottom characteristics may be obtained from an electronic chart system by providing inputs to the electronic chart system, for example GPS position of the vessel 101. The electronic chart system may provide the bottom characteristic of the water bottom 109 at the location of the vessel 101. In another example embodiment, the sonar 105 may itself determine characteristics of the water bottom 109 based on intensities of echoes received from the water bottom 109. The sonar 105 may receive echoes from the water bottom 109 and may analyze the echoes to determine a bottom characteristic of the water bottom 109. Further, the sonar 105 may receive echoes from one or more objects 107a, 107b and may analyze the echoes to perform detection of the one or more objects 107a, 107b.

Further, the bottom characteristics may be predefined and stored in one or more databases or any other suitable storage medium. The bottom characteristic may comprise information associated with characteristics of the water bottom 109. For example, information associated with a depth of the water bottom 109 from the surface of the water body 103, such as a depth of the water bottom from the surface of the water body more than a threshold value of depth (for example 20 meters), a depth of the water bottom from the surface of the water body less than the threshold value of depth. The bottom characteristics may also comprise information associated with a surface hardness of the water bottom 109. For example, the information may be associated with the water bottom 109 as hard water bottom with surface hardness more than a threshold value of surface hardness, and the water bottom 109 as a soft water bottom with surface hardness less than a threshold value of surface hardness.

Further, the bottom characteristics may comprise echo data associated with different types of water bottom (deep water bottom, shallow water bottom, hard water bottom, intermediate hard water bottom, or soft water bottom). Further, the bottom characteristics may comprise a type of sediments in the water bottom 109. The type of water bottom sediments may be obtained from the one or more ultrasonic devices, for example sounders or the likes. The ultrasonic devices can classify the water bottom sediments into rock, gravel, sand, or mud based on echoes received from the water bottom sediments. Further, the one or more ultrasonic devices may provide hardness information based on echoes received from the water bottom sediments.

The hard water bottom may correspond to a water bottom made of material for example, but not limited to, hard rocks, stones or the like, whereas a soft water bottom may correspond to water bottom made of a material for example, but not limited to mud, sand, algae or the like. An intermediate hardness may correspond to water bottom made of gravel, pebbles, or small stones. Further, information associated with the water bottom sediments may be obtained from an electronic chart system by providing inputs to the electronic chart system, for example GPS position of the vessel 101. The electronic chart system may provide the information associated with water bottom sediments at the location of the vessel 101 based on the GPS position. A surface of the water bottom 109 is hard when hardness of the surface of the water bottom 109 is more than a threshold value of surface hardness. On the other hand, a surface of the water bottom 109 is soft when hardness of the surface of the water bottom 109 is less than a threshold value of surface hardness.

Further, based on the bottom characteristic, the sonar apparatus 105 sets a transmit intensity value of the transmit beam pattern in at least one of the vertically downward direction or a first range of directions in a vicinity of the vertically downward direction. Further, the sonar apparatus 105 sets a transmit intensity value of the transmit beam pattern in directions different from the at least one of the vertically downward direction or the first range of directions in the vicinity of the vertical direction. In order to reduce echo intensity received from the water bottom 109, the sonar apparatus 105 further dynamically sets the transmit intensity value of the transmit beam pattern in the at least one of the vertically downward direction or the first range of directions in a vicinity of the vertically downward direction less than the transmit intensity value of the transmit beam pattern in the directions different from the at least one of the vertically downward direction or the first range of directions in the vicinity of the vertical direction. A detailed explanation about adjusting the transmit beam pattern, based on the bottom characteristics is explained next with reference to FIG. 2.

Figure 2:
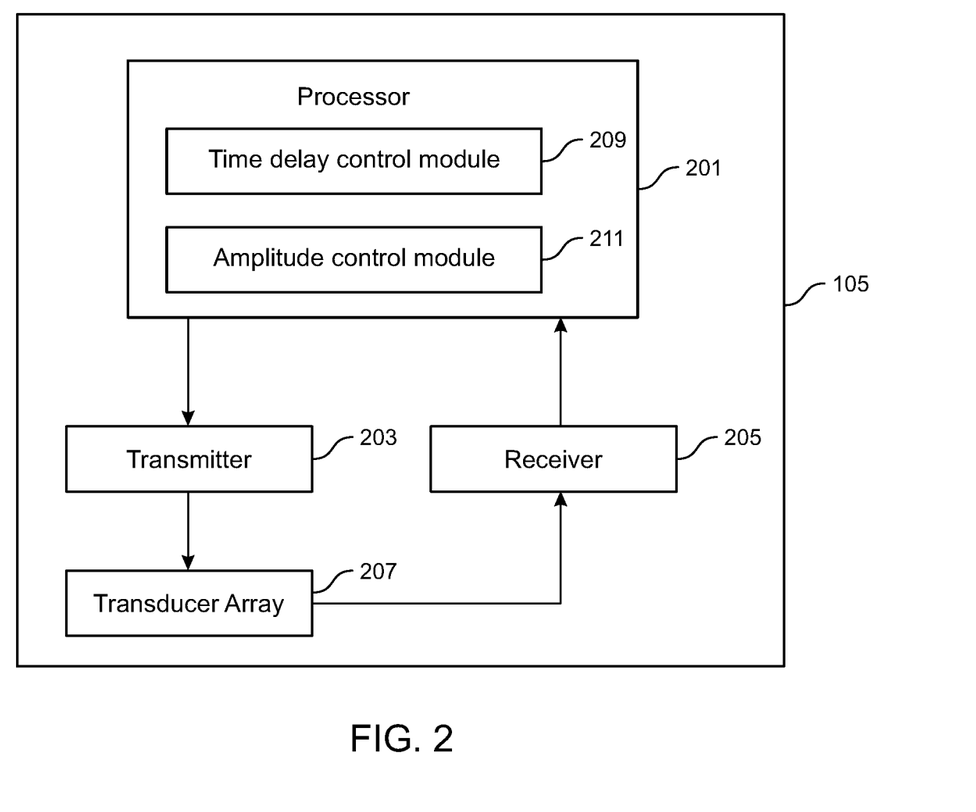
FIG. 2 illustrates a block diagram of the sonar apparatus, exemplarily illustrated in FIG. 1, for detecting one or more objects under a surface of a water body, in accordance with an example embodiment of the present disclosure.

The present disclosure provides an improved method for detection of the one or more objects 107a, 107b in the water body 103, as explained in detail in FIG. 2. FIG. 2 illustrates a block diagram of the sonar apparatus 105, exemplarily illustrated in FIG. 1, for detection of the one or more objects 107a, 107b in the water body 103, in accordance with an example embodiment. The sonar apparatus 105 may comprise a processing circuitry 201, a transmitter 203, a receiver 205, and a transducer array 207. The processing circuitry 201 comprises a time delay control module 209 and an amplitude control module 211. Hereinafter, the terms 'processing circuitry' and 'processor' may be used interchangeably and would mean the same. Each of the time delay control module 209 and the amplitude control module 211 may be realized using one or more processors and corresponding memory (not shown) storing computer executable instructions. The one or more processors may be embodied in a number of different ways. For example, the one or more processors may be embodied as one or more of various hardware processing means such as a coprocessor, a microprocessor, a microcontroller unit (MCU), a special-purpose computer chip, or the like. The memory may be non-transitory and may include, for example, one or more volatile and/or non-volatile memories.

Further, the transmitter 203 is communicatively connected with the processor 201 and the transducer array 207. The transmitter 203 generates a plurality of electric signals as per the instructions from the processor 201. The transmitter 203 provides the plurality of electric signals to the transducer array 207. The transducer array 207 comprises a plurality of transducer elements, where the plurality of transducer elements are configured to receive the plurality of electric signals from the transmitter 203 and convert the plurality of electric signals into the one or more ultrasonic waves. In an embodiment, the transmitter 203 is utilized to drive the transducer array 207 each time a transmission wave is to be transmitted (i.e. for each ping).

Further, the receiver 205 may receive echo signals from each transducer element of the transducer array 207. The receiver 205 may amplify, filter, and convert the echo signals from analog to digital with one or more A/D converters, and send the digital echo signals to the processor 201. The processor 201 may perform signal processing on the echo signals to form a plurality of reception beams.

The processor 201 obtains bottom characteristics of the water bottom 109 of the water body 103. As explained earlier with reference to FIG. 1, the processor 201 may obtain the bottom characteristic from one or more external devices. In an additional or alternate embodiment, the processor 201 may determine the bottom characteristic itself. Further, the processor 201 may then adjust the transmit beam pattern based on the bottom characteristics. The processor 201 may dynamically adjust a transmit intensity value of the transmit beam pattern, based on the bottom characteristics. The processor 201 instructs the transmitter 203 to generate the plurality of electric signals corresponding to the adjusted transmit intensity value. The transmitter 203 provides the plurality of electric signals to the transducer array 207 for the conversion of the plurality of electric signals into corresponding one or more ultrasonic waves. The transducer array 207 transmits the one or more ultrasonic waves according to the adjusted transmit beam pattern within the range of directions between the surface of the water body 103 and the vertically downward direction.

The processor 201 controls time delays (i.e., phases) and amplitudes of the plurality of electric signals. The time delay control module 209 is configured to control the time delays between the plurality of electric signals. Further, the amplitude control module 211 is configured to control the amplitudes of the plurality of electric signals. Thus, the processor 201 may adjust the transmit beam pattern (for example attenuation of one or more intensities in the transmit beam pattern) using the time delay module 209 and the amplitude control module 211.

In an embodiment, upon determination, by the processor 201, that the bottom characteristic corresponds to the water bottom with the depth less than the threshold depth value, for example 20 meters (i.e. a shallow water body), the processor 201 controls the transmitter 203 to adjust the transmit beam pattern with a first set of transmit intensity values in at least one of the vertically downward direction or in the first range of directions in the vicinity of the vertically downward direction. Further, the processor 201 controls the transmitter 203 to adjust the transmit beam pattern with a second set of transmit intensity values in a second range of directions. The second range of directions are different from the at least one of the vertically downward direction or the first range of directions. In order to reduce masking of echoes returned from the one or more objects 107a, 107b in the shallow water body, the processor 201 attenuates the first set of transmit intensity values more than the second set of transmit intensity values. Therefore, the first set of transmit intensity values is less than the second set of transmit intensity values.

In another embodiment, upon determination that the bottom characteristic corresponds to the water bottom with the depth more than the threshold depth value (i.e. a deep water body), the processor 201 further controls the transmitter 203 to adjust the transmit beam pattern with a third set of transmit intensity values in the at least one of the vertically downward direction or the first range of directions in the vicinity of the vertically downward direction. Further, the processor 201 controls the transmitter 203 to adjust the transmit beam pattern with a fourth set of transmit intensity values in the second range of directions. In order to reduce masking of echoes returned from the one or more objects 107a, 107b in the deep water body, the processor 201 attenuates the third set of transmit intensity values more than the fourth set of transmit intensity values. Therefore, the third set of transmit intensity values is less than the fourth set of transmit intensity values.

Further, to ensure that the one or more transmit beam patterns span a deeper and wider area in the deep water body than that in the shallow water body, the transmit intensities of the transmit beam pattern used in the deep water body is attenuated less than the transmit intensities of the transmit beam pattern used in the shallow water body. For example, to span deeper area (in vertically downward direction and in the first range of direction in the vicinity of the vertically downward direction) in the deep water body, the third set of intensity values associated with the deep water body is attenuated less than the first set of intensity values associated with the shallow water body. Therefore, one or more of the first set of transmit intensity values are less than the third set of transmit intensity values. Similarly, to ensure that the one or more transmit beam patterns span a wider area, in the second range of directions, in the deep water body, the fourth set of intensity values associated with the deep water body is attenuated less than the second set of intensity values associated with the shallow water body. Therefore, the second set of transmit intensity values is less on average than the fourth set of transmit intensity values.

In some embodiments, upon determination that the water bottom characteristic corresponds to the shallow water bottom, the processor 201 further determines whether the surface of the water bottom 109 is hard or soft. Upon determination that the bottom characteristic corresponds to the bottom with the value of the surface hardness more than the threshold value of surface hardness (i.e. the surface of the water bottom 109 is hard), the processor 201 further controls the transmitter 203 to adjust the transmit beam pattern in the vertically downward direction and in range of directions in vicinity of the vertically downward direction with a transmit intensity value less than the first set of transmit intensity values.

In some embodiments, upon determination that the bottom characteristic of the shallow water bottom corresponds to the bottom with the value of the surface hardness less than the threshold value of surface hardness (i.e. the surface of the water bottom 109 is soft), the processor 201 further controls the transmitter 203 to adjust the transmit beam pattern in the vertically downward direction and in the range of directions in vicinity of the vertically downward direction with a transmit intensity value more than the first set of transmit intensity values. Thus, depending on surface of the shallow water bottom 109 being hard or soft, the processor further adjusts the transmit beam pattern in the vertically downward direction and in the range of directions in vicinity of the vertically downward direction. The transmit intensity value of the transmit beam pattern may be further adjusted based on surface of the water bottom 109 being intermediate hard water bottom.

In another example embodiment of the present disclosure, there may be fluctuations in intensities of echo signals returned from the water bottom 109, from ping to ping. If the fluctuation in intensities of echo signals is not stabilized, it may again lead to masking of echoes returned from the one or more objects 107a, 107b. The fluctuations in intensities may be caused due to occurrence of air bubbles between the transducer array 207, transmitting plurality of ultrasonic waves, and the water bottom 109. The air bubbles may be produced by another watercraft or may be produced naturally by waves in the water body 103 (e.g. sea waves). The air bubbles are very good ultrasonic wave reflectors, therefore, if the air bubbles are located between the transducer array 207 and the water bottom 109 of the water body 103, a significant amount of energy of the ultrasonic waves transmitted by the transducer array 207 may be reflected by the air bubbles. Only a small part of the energy of the incident ultrasonic waves may go through the air bubbles and reach the water bottom 109. As a result, when the watercraft 101 passes above the air bubbles, there may be a sudden fall in intensities of echo signals received from the vertically down direction from the one or more objects 107a, 107b and/or the water bottom 109. After passing the air bubbles, there may be a sudden rise in intensities of echo signals received from the vertically downward direction from the one or more objects 107a, 107b and/or the water bottom 109.

For example, the sonar apparatus 105 may be transmitting the one or more transmit beam patterns corresponding to the deep water bottom characteristic. On encountering the air bubble, the intensities of echo signals in the vertically downward direction may increase. This may mask echoes returned from the one or more objects 107a, 107b and/or the water bottom 109. Therefore, the processor 201 is configured to determine the fluctuation in the intensities of the echo signals from the water bottom at different pings, and further configured to dynamically adjust the transmit intensity value of the transmit beam pattern based on the fluctuation of intensities of the echo signals. This stabilizes the fluctuation of the intensities and improves detection of the one or more objects 107a, 107b and/or the water bottom 109. The method to determine fluctuations and adjust the transmit beam pattern based on the fluctuations, is explained in detail below with reference to FIG. 2.

To determine the fluctuation, the apparatus 105 is configured to use the receiver 205 to receive the echo signals, returned from the water bottom 109, from each transducer element of the plurality of transducer elements of the transducer array 207. Each transducer element of the plurality of transducer elements may have received the echo signals from the water bottom 109. The receiver 205 may amplify, filter, and convert analog echo signals to digital echo signals with one or more A/D converters. The receiver 205 then provides the echo signals to the processor 201.

The processor 201 uses the echo signals received from the receiver 205 to create a reception beam oriented in the vertically downward direction. The reception beam is formed by delaying the received echo signals relative to each other and further by applying weight on each echo signal. The delayed and weighted echo signals are then combined to form the reception beam. The processor 201 uses the reception beam to calculate intensity of the echo signals received from the water bottom (i.e. water bottom echo intensity). The processor 201 further compares the water bottom echo intensity calculated in the current ping with the water bottom echo intensity calculated during the previous pings, to determine the fluctuation in the water bottom echo intensities.

Based on this comparison, the processor 201 controls the transmitter 203 to adjust the transmit intensity value of the transmit beam pattern. For example, if water bottom echo intensity for the current ping has decreased compared to water bottom echo intensities of previous pings, the processor 201 decreases attenuation of transmit intensity of the transmit beam pattern in the vertically downward direction and in the range of directions in vicinity of the vertically downward direction for the next ping. On the other hand, if water bottom echo intensity for the current ping has increased compared to water bottom echo intensities of the previous pings, the processor 201 increases attenuation of transmit intensity of the transmit beam pattern in the vertically downward direction and in the range of directions in vicinity of the vertically downward direction for the next ping. As a result, the fluctuation in intensities of the echo signals returned from the water bottom 109, (due to, for example, air bubbles) is reduced or stabilized.

Figure 3A:
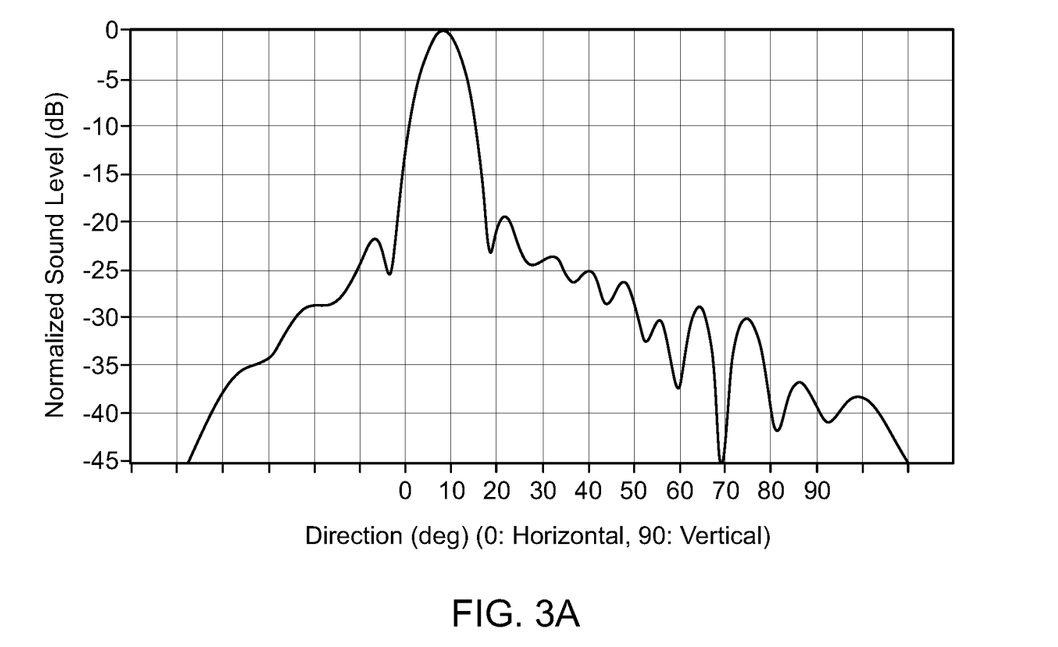
FIGS. 3A and 3B collectively illustrate exemplary representations of transmit beam patterns for shallow water bottom and deep water bottom respectively, in accordance with an example embodiment of the present disclosure.
Figure 3B:
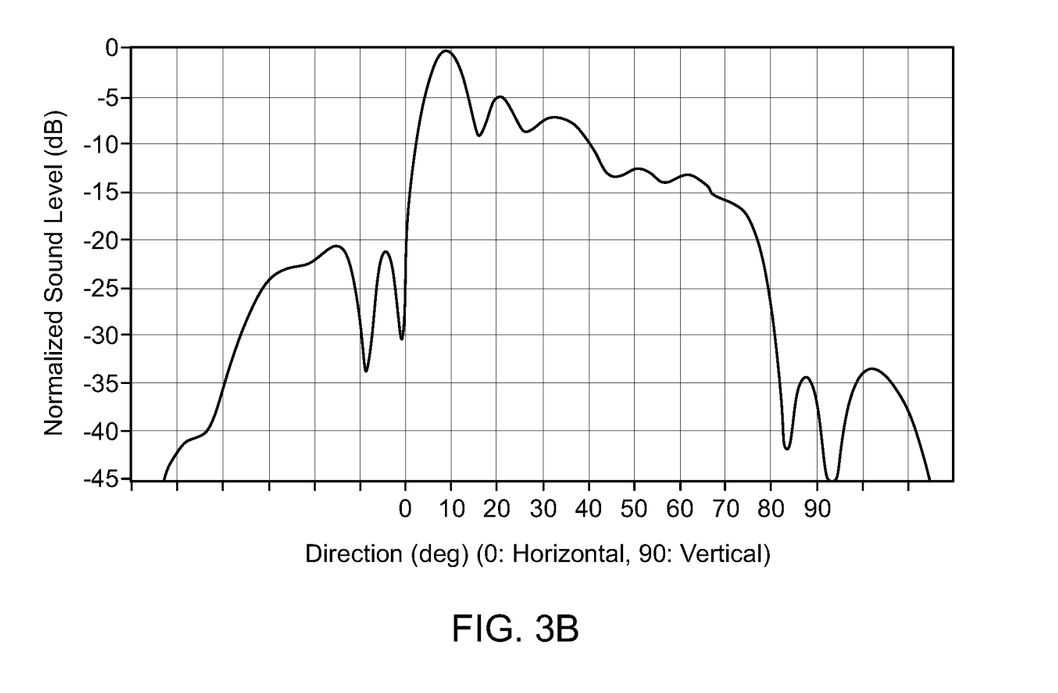

FIGS. 3A and 3B collectively illustrates exemplary representations of graph of transmit beam pattern used for shallow water body and deep water body, respectively. FIGS. 3A and 3B are explained in detail below in conjunction with FIG. 2. The graph of each transmit beam pattern represents directions in degrees (for example 0 deg: Horizontal/azimuth, 90 deg: vertically downward i.e. towards water bottom 109) on X axis and normalized sound level in decibels (dB) on Y axis. Each point in the graph represents a normalized sound level (in dB) of transmit waves in a particular direction (in degrees).

The transmit beam pattern in FIG. 3A comprises the first set of intensity values and the second set of intensity values, as described earlier with reference to FIG. 2. In FIG. 3A the first set of transmit intensity values of the transmit beam pattern is associated with ultrasonic waves transmitted along 90 deg direction (perpendicular to the water bottom). The first set of transmit intensity values are attenuated by at least 35 dB compared to highest transmit intensity values corresponding to 0 deg to 10 deg directions. The transmit beam pattern further comprises the second set of transmit intensity values associated with ultrasonic waves transmitted in directions other than the vertically downward direction, for example, 30 deg-60 deg. The second set of intensity values are attenuated such that echoes corresponding to ultrasonic waves transmitted in the range of direction other than the vertically downward direction are not masking echoes of the one or more ultrasonic waves transmitted in the 0 deg to 10 deg directions in which the sonar focuses in the shallow water body. For example, intensities in 60 deg direction are attenuated by at least 30 dB as compared to highest intensities in between 0 deg-10 deg and intensities in 30 deg direction are attenuated by at least 20 dB compared to highest intensities in between 0 deg-10 deg. Thus, it can be observed that attenuation of the intensities (in the second set of intensity values) of the one or more ultrasonic waves transmitted in the range of direction other than the vertically downward direction is less than attenuation of the intensities (in the first set of intensity values) of the one or more ultrasonic waves transmitted in the vertically downward direction. Therefore, intensities in the second set of intensity values are more than intensities in the first set of intensity values.

Further, the transmit beam pattern illustrated in FIG. 3B comprises the third set of intensity values and the fourth set of intensity values, as described earlier in FIG. 2. In FIG. 3B the third set of intensity values of the transmit beam pattern is associated with ultrasonic waves transmitted at 90 deg direction (perpendicular to the water bottom). The third set of intensity values are attenuated by at least 30 dB compared to highest intensity values corresponding to 0 deg to 10 deg directions. Further, the transmit beam pattern in FIG. 3B comprises the fourth set of intensity values associated with the one or more ultrasonic waves transmitted in the range of directions other than the vertically downward direction for example 30 deg-60 deg. The fourth set of intensity values are attenuated such that echoes of the one or more ultrasonic waves transmitted in the range of directions other than the vertically downward direction can be detected. For example, intensities in 60 deg direction are attenuated by at least 10 dB compared to highest intensities in between 0 deg-10 deg and intensities in 30 deg direction is attenuated by at least 5 dB compared to highest intensities in between 0 deg-10 deg. Thus, it can be observed that attenuation of the intensities (in the fourth set of intensity values) of the one or more ultrasonic waves transmitted in the direction other than the vertically downward direction is less than attenuation of the intensities (in the third set of intensity values) of the one or more ultrasonic waves transmitted in the vertically downward direction. Therefore, intensities in the fourth set of intensity values are more than intensities in the third set of intensity values.

Figure 4:
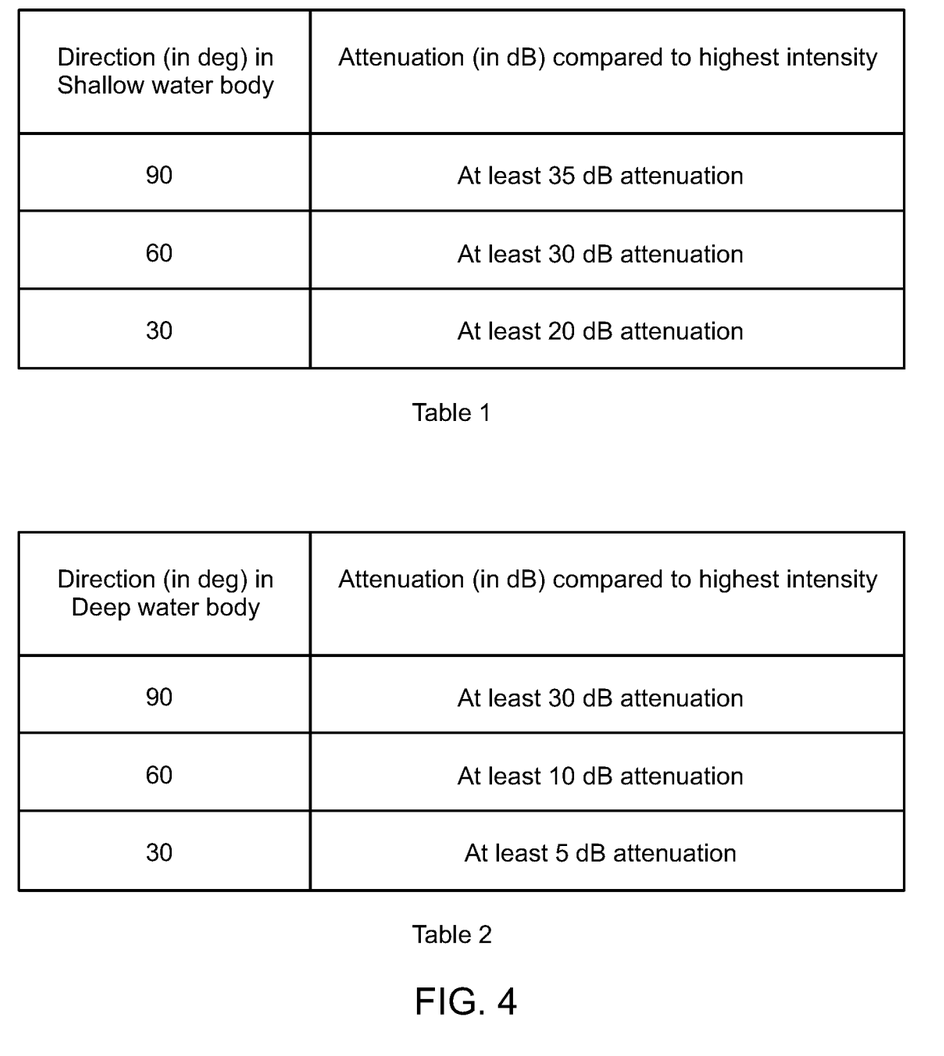
FIG. 4 illustrates exemplary representation of tables (Table 1, Table 2) that summarize attenuation of transmit beam patterns for shallow water bottom and deep water bottom respectively, in accordance with an example embodiment of the present disclosure.

FIG. 4 illustrates Table 1 and Table 2 that summarize the attenuation of the transmit beam pattern for shallow and deep water body, respectively. Table 1 shows attenuation values compared to highest intensity for different directions in shallow water body. Table 2 shows attenuation values compared to highest intensity for different directions in deep water body. As can be observed from the tables in FIG. 4, attenuation of intensities of the one or more ultrasonic waves associated with shallow water body (Table 1) is more than attenuation of intensities of the one or more ultrasonic waves associated with deep water body (Table 2). This signifies that the one or more ultrasonic waves transmitted in the shallow water body are of weaker intensities (the first set of intensity values and the second set of intensity values) than that of intensities (the third set of intensity values and the fourth set of intensity values) of the one or more ultrasonic waves transmitted in the deep water body. Thus, dynamic adjustment of the transmit beam pattern based on the bottom characteristics ensures that the echoes from the one or more objects 107a, 107b are not masked by the echoes from the water bottom 109.

Further, based on the water bottom sediment information, surface of the water bottom 109 may be identified as at least one of hard surface, intermediate hard surface, or soft surface. Depending on the type of surface of the water bottom 109, transmit intensities of the transmit beam pattern associated with the shallow water body, as illustrated in FIG. 3A, are adjusted. For example, upon determination that the surface of the water bottom is hard and as the hard surface reflects more energy of ultrasonic waves compared to the soft surface, consequently, attenuation of the first set intensity values is increased. Similarly, as the soft surface of the water bottom reflects less energy of the ultrasonic waves, therefore, attenuation of the first set intensity values is decreased.

Figure 5:
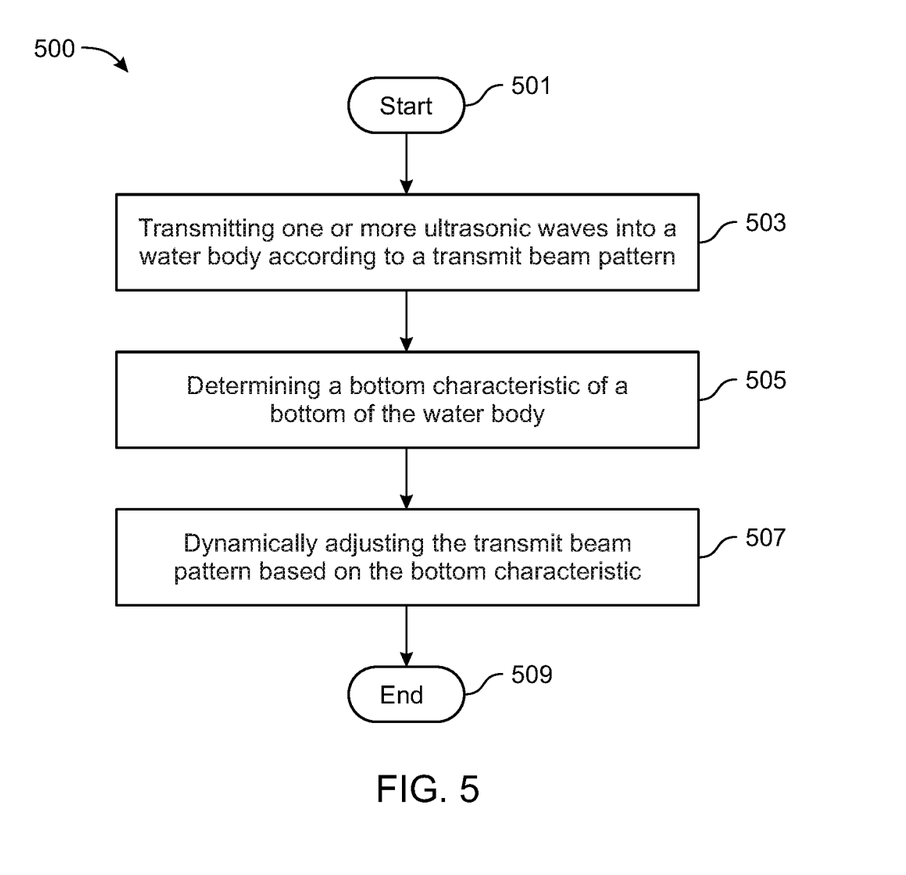
FIG. 5 illustrates a flowchart for implementation of an exemplary method for detecting one or more objects under a surface of a water body, in accordance with an example embodiment of the present disclosure.

FIG. 5 illustrates a flowchart for implementation of an exemplary method 500 for detecting one or more objects 107a, 107b under a surface of water body 103, in accordance with an example embodiment. It will be understood that each block of the flowchart and combination of blocks in the flowchart may be implemented by various means, such as hardware, firmware, processor, circuitry, and/or other communication devices associated with execution of software including one or more computer program instructions. Accordingly, blocks of the flowcharts support combinations of means for performing the specified functions and combinations of operations for performing the specified functions.

The method 500 for detecting the one or more objects 107a, 107b under the surface of water body may include, at step 503 transmitting one or more ultrasonic waves into a water body according to a transmit beam pattern. Further, the method includes at step 505, determining a bottom characteristic of a bottom of the water body 103. In some example embodiments, the bottom characteristics may be obtained from one or more external devices, where the one or more external devices may be sounders or any other ultrasonic devices. The bottom characteristic may be at least one of a deep bottom, a shallow water bottom, a water bottom with hard surface, or a water bottom with soft surface. Further, at step 507, the method 500 includes dynamically adjusting the transmit beam pattern based on the bottom characteristic of the water bottom 109.

Example embodiments of the present disclosure may thus provide for dynamic adjustment of the transmit beam pattern based on characteristics of a bottom of a water body. Dynamically adjusting the transmit beam pattern reduces masking of echoes returned from the one or more objects by echoes returned from the water bottom. The reduction of masking of the echoes from the one or more objects, increases detectability of the one or more objects by a sonar under a surface of the water body. Therefore, the present disclosure leads to an improved method for detecting the one or more objects under the surface of the water body.

Many modifications and other embodiments of the inventions set forth herein will come to mind of one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms) Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A sonar apparatus for detecting one or more objects under a surface of a water body, the apparatus comprising:
    a transducer array, comprising a plurality of transducer elements, the transducer array configured to transmit one or more ultrasonic waves into the water body according to a transmit beam pattern; and
    processing circuitry configured to:
        determine a bottom characteristic of a bottom of the water body, the bottom characteristic representing at least one of depth of the bottom of the water body, surface hardness of the bottom of the water body or types of sediments in the bottom of the water body; and
        dynamically adjust the transmit beam pattern automatically, based on a relationship of the bottom characteristic of the water body to a predetermined threshold.

2. The apparatus of claim 1, further comprising:
    a transmitter configured to generate a plurality of electric signals;
    wherein the plurality of transducer elements are configured to receive the plurality of electric signals and convert the plurality of electric signals into the one or more ultrasonic waves.

3. The apparatus of claim 2, wherein to dynamically adjust the transmit beam pattern, based on the bottom characteristic, the processing circuitry is configured to adjust at least one of a time delay between the plurality of electric signals or an amplitude of the plurality of electric signals.

4. The apparatus of claim 1, wherein the transducer array is configured to transmit the one or more ultrasonic waves within a range of directions between the surface of the water body and a vertically downward direction.

5. The apparatus of claim 4, wherein a transmit intensity of the transmit beam pattern in the vertically downward direction is less than a transmit intensity of the transmit beam pattern in other directions of the range of directions.

6. The apparatus of claim 1, wherein the relationship of the bottom characteristic to the predetermined threshold comprises at least one of:
    the depth of the bottom of the water body less than a threshold depth value,
    the depth of the bottom of the water body greater than the threshold depth value,
    the surface hardness of the bottom of the water body more than a threshold value of surface hardness, or
    the surface hardness of the bottom of the water body less than the threshold value of surface hardness.

7. The apparatus of claim 2, wherein the relationship of the bottom characteristic to the predetermined threshold comprises at least one of:
    the depth of the bottom of the water body less than a threshold depth value,
    the depth of the bottom of the water body greater than the threshold depth value,
    the surface hardness of the bottom of the water body more than a threshold value of surface hardness, or
    the surface hardness of the bottom of the water body less than the threshold value of surface hardness.

8. The apparatus of claim 7, wherein upon determination that the bottom characteristic corresponds to the bottom with the depth less than the threshold depth value, the processing circuitry is configured to adjust, via the transmitter, the transmit beam pattern with a first set of transmit intensity values in a range of directions in a vicinity of the vertically downward direction and with a second set of transmit intensity values in other directions in a range of directions between the surface of the water body and the vertically downward direction, and wherein the first set of transmit intensity values is less than the second set of transmit intensity values.

9. The apparatus of claim 8, wherein upon determination that the bottom characteristic corresponds to the bottom with the depth more than the threshold depth value, the processing circuitry is further configured to adjust, via the transmitter, the transmit beam pattern with a third set of transmit intensity values in the range of directions in the vicinity of the vertically downward direction and with a fourth set of transmit intensity values in the other directions, and wherein the third set of transmit intensity values is less than the fourth set of transmit intensity values.

10. The apparatus of claim 9, wherein one or more of the first set of transmit intensity values are less than the third set of transmit intensity values.

11. The apparatus of claim 9, wherein the second set of transmit intensity values is less on average than the fourth set of transmit intensity values.

12. The apparatus of claim 10, wherein the second set of transmit intensity values is less on average than the fourth set of transmit intensity values.

13. The apparatus of claim 8, wherein upon determination that the bottom characteristic corresponds to the bottom with the value of the surface hardness more than the threshold value of surface hardness, the processing circuitry is further configured to adjust the transmit beam pattern in the range of directions in the vicinity of the vertically downward direction with transmit intensity values less than the first set of transmit intensity values.

14. The apparatus of claim 8, wherein upon determination that the bottom characteristic corresponds to the water bottom with the value of surface hardness less than the threshold value of surface hardness, the processing circuitry is further configured to adjust the transmit beam pattern in the range of directions in the vicinity of the vertically downward direction with transmit intensity values more than the first set of transmit intensity values.

15. The apparatus of claim 1, further comprising:
    a receiver configured to receive one or more echo signals corresponding to the one or more ultrasonic waves transmitted towards the bottom of the water body,
    wherein the processing circuitry is further configured to:
        obtain intensities of the one or more echo signals of the bottom;
        determine fluctuations in the intensities of the one or more echo signals of the bottom from ping to ping; and
        adjust the transmit beam pattern based on the fluctuations.

16. The apparatus of claim 1, wherein the processing circuitry is configured to obtain the bottom characteristic from one or more external devices that are external to the sonar apparatus.

17. A method for detecting one or more objects under a surface of a water body, the method comprising:
- transmitting one or more ultrasonic waves into the water body according to a transmit beam pattern;
- determining a bottom characteristic of a bottom of the water body, the bottom characteristic representing at least one of depth of the bottom of the water body, surface hardness of the bottom of the water body or types of sediments in the bottom of the water body; and
- dynamically adjusting the transmit beam pattern automatically, based on a relationship of the bottom characteristic of the water body to a predetermined threshold.

* * * * *